(12) United States Patent
Zhou et al.

(10) Patent No.: US 7,025,943 B2
(45) Date of Patent: Apr. 11, 2006

(54) METHOD FOR PREPARATION OF NANOMETER CERIUM-BASED OXIDE PARTICLES

(75) Inventors: Xiao-Dong Zhou, Rolla, MO (US); Wayne Huebner, Rolla, MO (US); Harlan U. Anderson, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 377 days.

(21) Appl. No.: 10/146,824

(22) Filed: May 15, 2002

(65) Prior Publication Data

US 2003/0215378 A1    Nov. 20, 2003

(51) Int. Cl.
*C01F 17/00* (2006.01)

(52) U.S. Cl. ..................... 423/263; 423/21.1
(58) Field of Classification Search ............... 423/21.1, 423/263
See application file for complete search history.

(56) References Cited

U.S. PATENT DOCUMENTS 4,786,325 A * 11/1988 Melard et al. ............... 106/3
5,017,352 A    5/1991 Chane-Ching et al.
5,080,877 A    1/1992 Chane-Ching et al.
5,712,218 A    1/1998 Chopin et al.
5,938,837 A    8/1999 Hanawa et al.
5,962,343 A * 10/1999 Kasai et al. ................. 438/693

* cited by examiner

Primary Examiner—Steven Bos
(74) Attorney, Agent, or Firm—William D. Jackson (57) ABSTRACT

The invention comprises novel undoped and doped nanometer-scale $CeO_2$ particles as well as a novel semi-batch reactor method for directly synthesizing the novel particles at room temperature. The powders exhibited a surface area of approximately 170 $m^2/g$ with a particle size of about 3–5 nm, and are formed of single crystal particles that are of uniform size and shape. The particles' surface area could be decreased down to 5 $m^2/g$, which corresponds to a particle size of 100 nm, by thermal annealing at temperatures up to 1000° C. Control over the particle size, size distribution and state of agglomeration could be achieved through variation of the mixing conditions such as the feeding method, stirrer rate, amount of $O_2$ gas that is bubbled through the reactor, the temperature the reaction is carried out at, as well as heating the final product at temperatures ranging from 150° to 1000° C.

18 Claims, 12 Drawing Sheets

METHOD FOR PREPARATION OF NANOMETER CERIUM-BASED OXIDE PARTICLES

FIELD OF THE INVENTION

This invention relates to novel undoped and doped nanometer-scale metal oxide particles as well as a novel method for directly synthesizing doped and undoped nanometer-scale $CeO_2$ particles having a controlled particle size ranging from 3–100 nanometers.

BACKGROUND OF THE INVENTION

Cerium dioxide ($CeO_2$) based materials have been studied for use in various applications including 1) fast ion conductors; 2) oxygen storage capacitors; 3) catalysts; 4) UV blockers; and 5) polishing materials. Pure and doped $CeO_2$ exhibits the cubic fluorite structure, similar to $ZrO_2$. Doping $CeO_2$ with lanthanide series elements (e.g. $Gd^{3+}$) results in the formation of oxygen vacancies ($[Gd^{3+}]=2[Vo^{°°}]$), and a high ionic conductivity, $\sigma_i$. In particular, $Ce_{0.9}Sm_{0.1}O_{1.95}$ exhibits a $\sigma_i=0.025$ $(\Omega*cm)^{-1}$ at 600° C., which is more than five times that of $ZrO_2$ based materials. As such $Ce_{0.9}Sm_{0.1}O_{1.95}$ is an attractive choice for use as a low temperature electrolyte and as an anode component in solid oxide fuel cells (SOFC).

Ceria particles can also be used as catalysts, such as three-way catalysts to purify exhaust gases, such as for automobiles. This application requires a high oxygen storage content (OSC). In order to improve the OSC, the ceria may be doped with lanthanide elements. The use of high surface area, nanocrystalline powder could benefit all of these applications.

Typically, processes for preparing nanocrystalline $CeO_2$ involve simple oxidation of Ce metal clusters to form $CeO_2$, or solution processes that take advantage of the small solubility product of $Ce(OH)_3(10^{-23})$. In addition, such processes involve reaction temperatures of 100° C. or higher. This results in larger particle sizes and lower surface area of the crystals. The particle size is inversely related to the specific surface area ("SSA").

An example process is found in, U.S. Pat. No. 5,017,352 which discloses ceria having a SSA of at least 85±5 m2/g. The ceria particles are made from the hydrolization of cerium (IV) nitrate solution in an acidic medium and followed by calcining the washed and dried precipitate in the temperature range of 300° to 600° C. for a period of 30 minutes to ten hours. This basic process can also be used to produce ceria having a SSA of at least 130 m2/g as disclosed in U.S. Pat. No. 5,080,877. The ceria is formed by reacting an aqueous solution of cerium (IV) salt with an aqueous solution of sulfate ions to precipitate a basic ceric sulfate, washing the precipitate with ammonia and then calcined in a furnace at 400° C. for 6 hours.

It is also possible to generate single crystal grains ranging in size from 10 to 80 nm of cerium oxide that have a uniform particle size and shape. This is disclosed in U.S. Pat. No. 5,938,837 as being accomplished by mixing cerous nitrate with a base to keep the pH from 5 to 10 and then rapidly heating the mixture to 70° to 100° C. and maintaining the mixture at that temperature from about 30 minutes to 10 hours.

U.S. Pat. No. 4,786,325 discloses a method for the production of a solid solution of cerium oxide and a lanthanide series metal. This is achieved by combining a cerium salt, a basic solution, and a lanthanide salt. The mixture is reacted at either 10–25° C. or 40–95° C., filtered, dried, and calcinated at 600 to 1200° C. for a period of time of 30 minutes to 10 hours. The particles are ground so that their mean particle size is from 0.5 to 1.5 µm and the resulting SSA is from 2 to 10 m2/g.

U.S. Pat. No. 5,712,218 discloses a method for producing a solid solution of cerium/zirconium mixed oxides that optionally can include yttrium. The method involves mixing stoichiometric amounts of soluble compounds of cerium, zirconium and optionally yttrium, heating the mixture to at least 100° C., and filtering out the product. Optionally the product can be further calcinated at between 200° to 1000° C. However, it is disclosed that the calcinations process will reduce the surface area of the solid solution. The SSA of the uncalcinated solid solution can reach over 150 m2/g.

SUMMARY OF THE INVENTION

The present invention involves the use of a semi-batch reactor process to synthesize metal oxide particles with controllable particle size between 3 to 100 nm and with uniform particle size and shape. The invention will be described in detail with respect to the use of cerium, however the invention is applicable to the use of iron, chromium, manganese, niobium, copper, nickel, and titanium in place of or in combination with cerium. The basic process involves mixing a cerium salt and an alkali metal or ammonium hydroxide, which operates as a precipitant, to form a precipitate, and then filtering and drying the precipitate. The mixture is preferably constantly stirred at a rate that ensures turbulent conditions to enhance the mixing.

In carrying out the present invention a first solution of a water-soluble cerium salt is mixed with a second solution of an alkali metal or ammonium hydroxide are mixed together to form a reactant solution. While the reactant solution is agitated under turbulent flow conditions, oxygen is passed through the reactant solution. Cerium dioxide particles having a predominant particle size within the range of 3–100 nanometers are precipitated from the reactant solution. In a preferred embodiment of the invention, the second aqueous solution is an aqueous solution of ammonium hydroxide with a concentration of ammonium hydroxide in water within the range of 0.1 moles to 1.5 moles per liter. While ammonium hydroxide is preferred, other alkali metal hydroxides, such as sodium or potassium hydroxide, can be employed.

There are a number of variables involved in the mixing step that can be controlled in order to synthesize ceria particles of uniform shape at the desired particle size. First, the amount of oxygen gas that is bubbled through the reactor as the reactants are mixed will affect the particle size. Bubbling oxygen gas through the reactor decreases the particle size of the ceria particles. Using the oxygen gas allows the synthesis of ceria particles that are as small as 3 nm as opposed to particles that are 12 nm when oxygen is omitted. Second, adjusting the temperature at which the reaction takes place will also affect the particle size. This method will result in the synthesis of ceria particles of 15 nm at 20° C. and 50 nm sized particles of ceria at 70° C. In addition, heating the produced ceria particles for one hour will result in their coarsening to larger particle sizes depending on the temperature being used.

Finally, the order with which the two reactants are mixed will affect the pH value at which crystallization takes place. In the case of adding the precipitate into the salt (PIS), the pH starts out low, due to the slightly acidic nature of the cerium salt. As a result, while the primary particle size is approximately 10 nm, the agglomerates are large and non-uniform in shape. On the other hand, in the case of the addition of the salt into the precipitate (SIP), the pH remains higher than 9 during the entire reaction. This results in particle size approximately the same as the primary particle size from the PIS process, however, there is significantly less agglomeration and the particles were of uniform size and shape due to homogenous nucleation.

Consequently, by using this process, it is possible to synthesize ceria particles that have a uniform shape and size and whose size is controllable within the range of 3 nm to 100 nm.

DETAILED DESCRIPTION OF THE INVENTION

The liquid phase precipitation process of this method includes three mechanisms: chemical reaction, nucleation, and crystal growth. It was found that in most cases these three mechanisms are fast, hence the mixing procedure has a large influence on the product particle size and its distribution. Therefore, control over the nucleation and growth mechanisms are achieved by controlling the mixing conditions.

Figure 1:
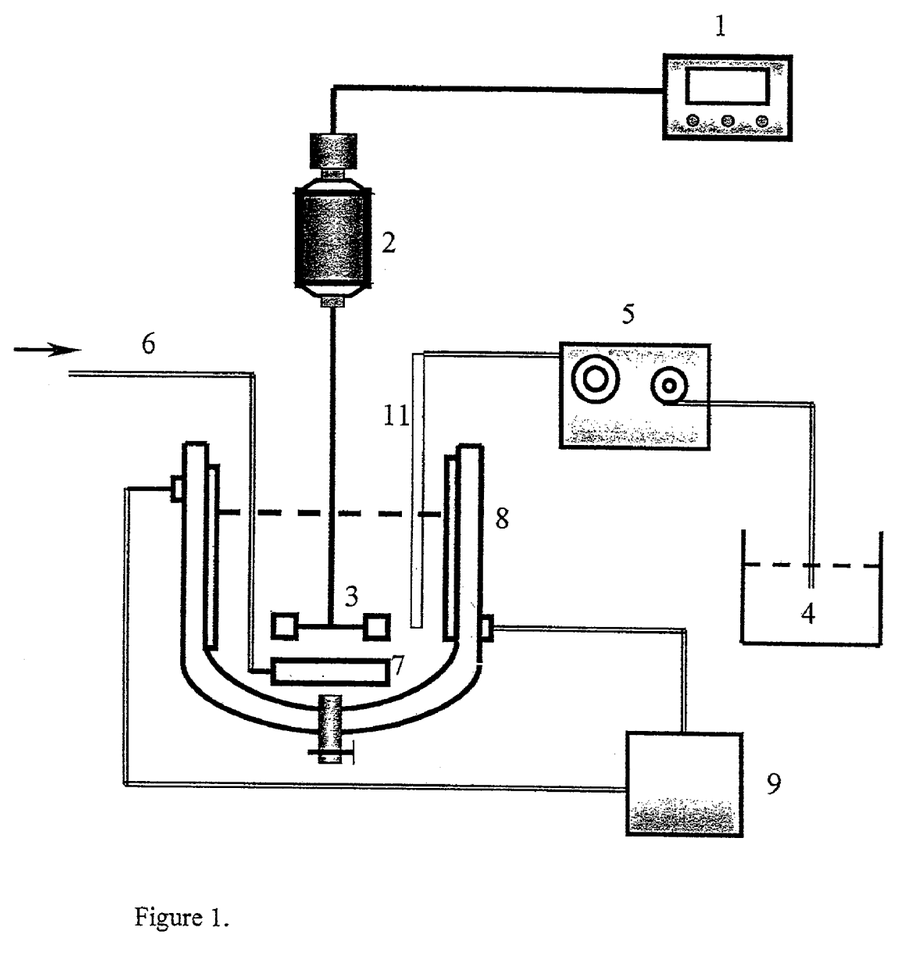
FIG. 1 is a schematic representation of the reactor setup used to carry out this method

The prepared precursors for this method are: aqueous solution of ammonium hydroxide (0.1 to $1.5*10^{-3}$ mol/g), cerium salt solution, preferably cerium nitrate hexahydrate, $Ce(NO_3)_3.6H_2O$, (GIF, 99.9%) solution (0.6 to $0.8*10^{-3}$ mol/g), and nitrat acetates of lanthanide series metals as the dopant precursor. The use of excessive precipitant is preferred so that the pH value is ≈9 after the reaction is complete. The reaction can be carried out in a system as shown in FIG. 1. The cerium salt and the ammonium hydroxide are fed into a semi-batch reactor 8. This can be accomplished by placing the ammonium hydroxide solution in reactor 8 and placing the cerium salt in a precursor vessel 4 (SIP feeding). A Peristaltic pump 5 is provided to pump the solution from the precursor vessel 4 into reactor 8 at a fixed rate. Alternatively, the ammonium hydroxide can be placed into precursor vessel 4 and the cerium salt placed in reactor 8 (PIS feeding). Finally, there can be a second precursor vessel (not shown) and peristaltic pump (not shown) and each precursor can be separately fed into reactor 8 which would contain distilled water. It is preferred that the solutions being fed into the reactor by pump 5 is fed at a rate within the range of 0.5 to 10 ml/min. Any dopant precursor that is being used can either be added to the cerium salt solution or fed into the reactor from a separate precursor vessel by an additional peristaltic pump.

Figure 2:
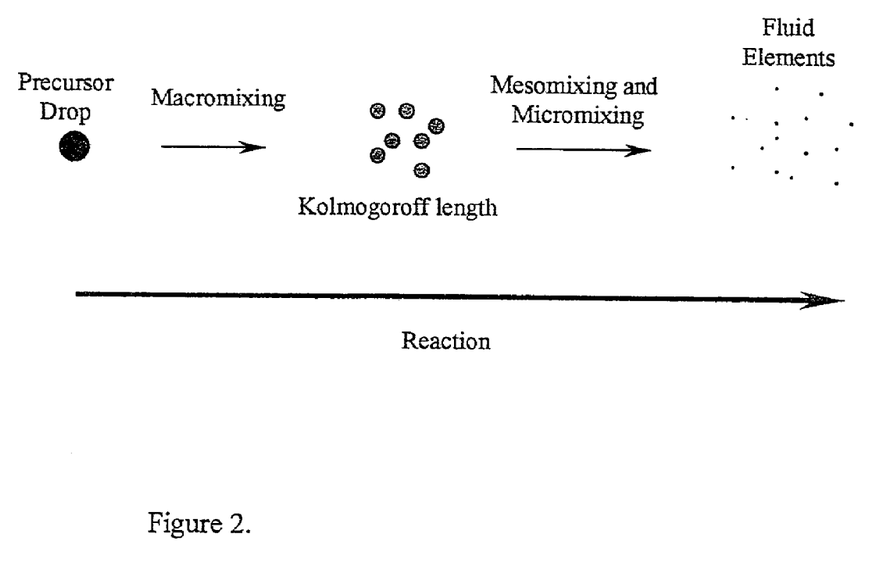
FIG. 2 is a schematic of the scale of the mixing steps

Impeller 3 is provided to maintain turbulent conditions in reactor 8. It is powered by motor 2 that preferably has a 0–15000 rpm range and is preferably operated in the 100–5000 rpm range. Motor 2 is controlled by rate controller 1. The stirring rate rapidly distributes the particles and prevents their concentration from being localized at the region near the feed point. This insures that micromixing is occurring as opposed to the slower macromixing that would otherwise occur as a result of the reaction only occurring at the surface of the drops of reactant. The scale of mixing is schematically depicted in FIG. 2. An increase of the impeller speed to generate turbulent conditions does not change the primary particle size, but does significantly decrease the agglomerate size. The onset of turbulent flow occurs when the Ad Reynolds number, $R_e$, is $\geq 1 \cdot 10^4$. The Reynolds number is defined by $$R_e = \frac{D^2 N \rho}{\mu},$$

where D is the motor's impeller diameter (m), N is the impeller speed (rpm), $\rho$ is the liquid density ($kg/m^3$) and $\mu$ is the liquid viscosity (cp). Returning to FIG. 1, the rate controller 1 is used to keep impeller 3 at the proper rpm range to maintain turbulent conditions in reactor 8. Rate controller 1 also automatically adjusts the power load to motor 2 in order to keep impeller 3 at a constant rpm as the viscosity of the slurry in reactor 8 changes.

Figure 3:
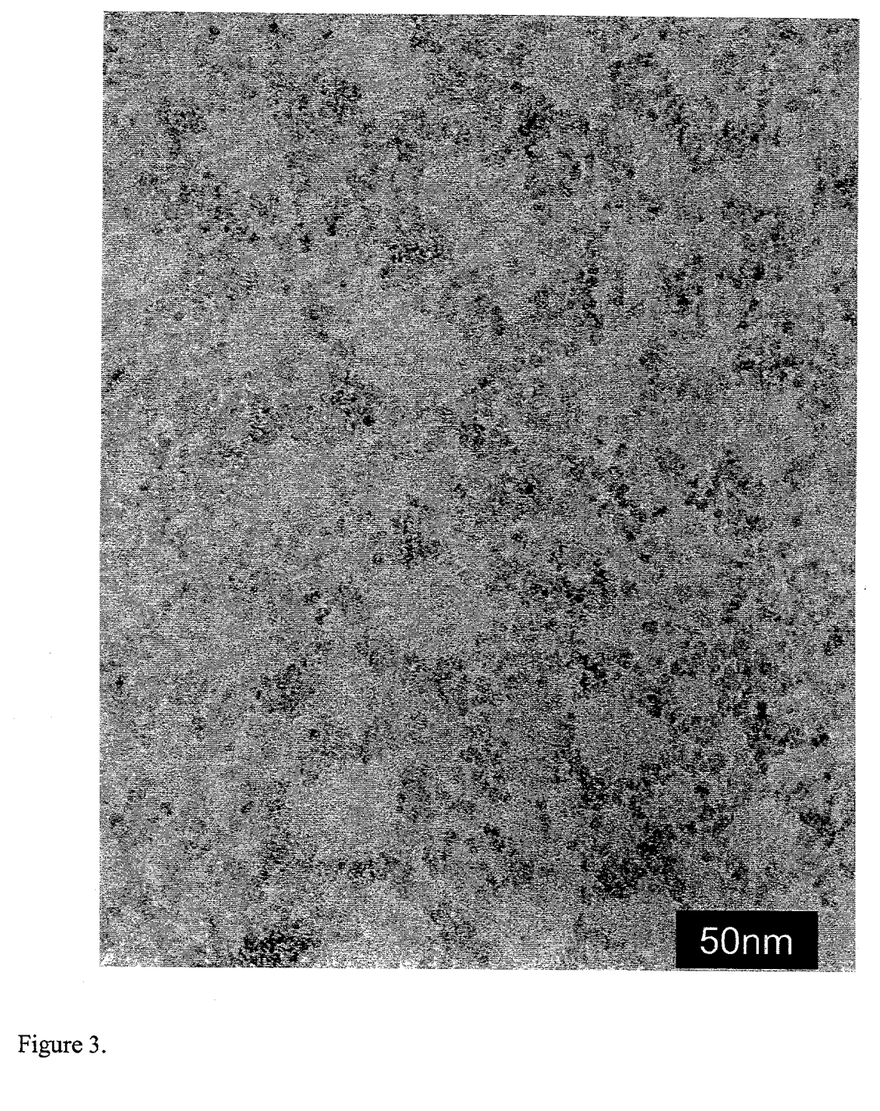
FIG. 3 is a TEM image of the powders prepared at high stirrer rate using SIP and bubbling oxygen through the reactor.

FIG. 3 depicts a TEM micrograph of the resultant $CeO_2$ particles when impeller 3 was set at 500 rpm, which corresponds to a $R_e \approx 1.3 \cdot 10^4$. When the same method was used, with the exception that impeller 3 was set at 100 rpm, $R_e \approx 2.6 \cdot 10^3$, the primary particle size was the same, however the agglomerate size was significantly increased.

The order the reactants are added also plays an important role in the resulting powder. It appears that the nucleation and growth of the $Ce(OH)_3$ occurs at the droplet:reactant interface. The difference between whether the cerium salt is added to the ammonium hydroxide (SIP feeding) or the ammonium hydroxide is added to the cerium salt (PIS feeding) is the pH value at which crystallization takes place.

Figure 4:
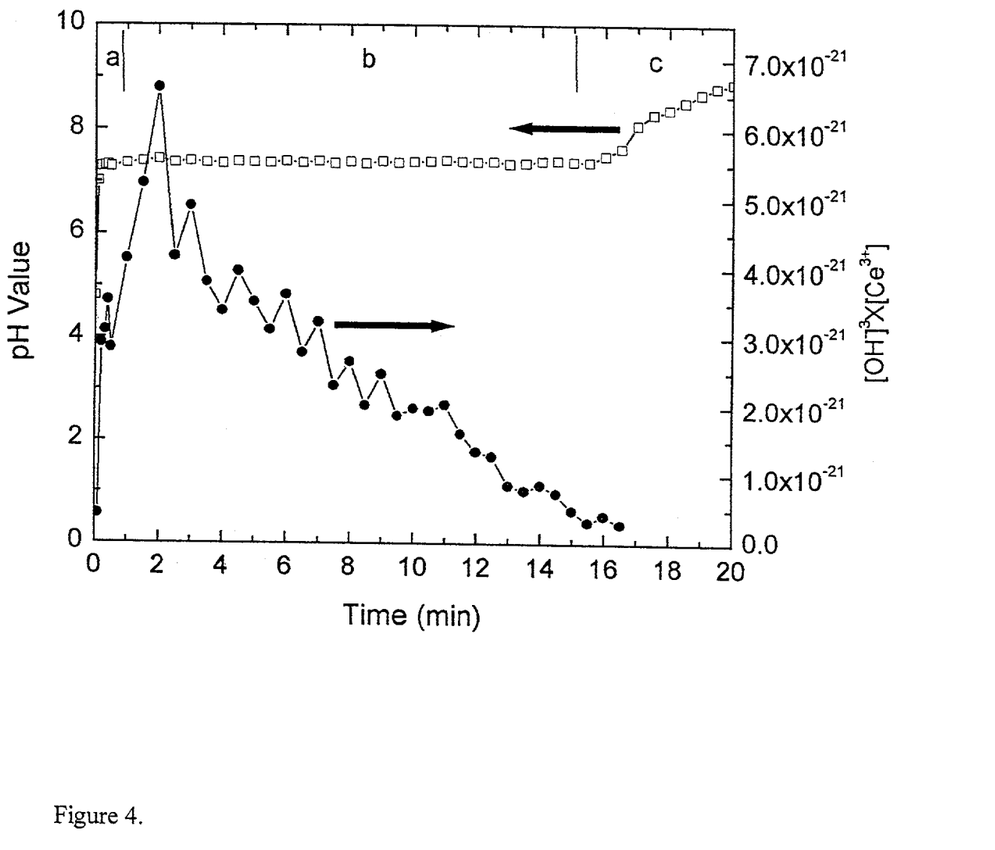
FIG. 4 is a graph of the pH evolution and the cerium ion dissipation in the PIS process without using oxygen.

FIG. 4 shows a graph with the pH value on the first ordinate axis, time in minutes on the abscissa axis, and cerium hydroxide concentration on the second ordinate axis for the PIS feeding process. In PIS feeding, the pH value in the reactor is initially very low (pH ≈3.8–4.3 for the cerium nitrate solution), and increases rapidly with the addition of just a few drops of ammonium hydroxide to a value of approximately 7.2. Further additions resulted in a slight but steady increase in pH as the $Ce^{+3}$ ions were consumed, with a sharp transition of pH when the reaction was close to the end. FIG. 4 also shows the evolution of the solubility product of $[Ce^{+3}][OH^-]^3$ over the course of the reaction. This value is less then the critical solubility constant of $Ce(OH)_3$, which is $\approx 7 \cdot ^{-21}$. Under these conditions, even though a nucleus may form at the drop:reactant interface, it is in an unstable state because of the low pH value of the bulk solution. This results in a redissolution process called ripening. Consequently the particles synthesized are highly agglomerated and non-uniform in shape.

As shown in FIG. 4, which shows PIS feeding with no oxygen bubbling and the mixer set at 500 rpm, the reaction results in interesting color changes to the slurry. The slurry was initially purple in section a (low pH), transitioned to brown in section b (intermediate pH), and then turned yellow in section c (high pH). These color changes appear to relate to the valence state of the Ce, with most likely purple corresponding to $Ce^{+3}$, yellow corresponding to $Ce^{+4}$, and brown corresponding to a mix of these two states.

Figure 5:
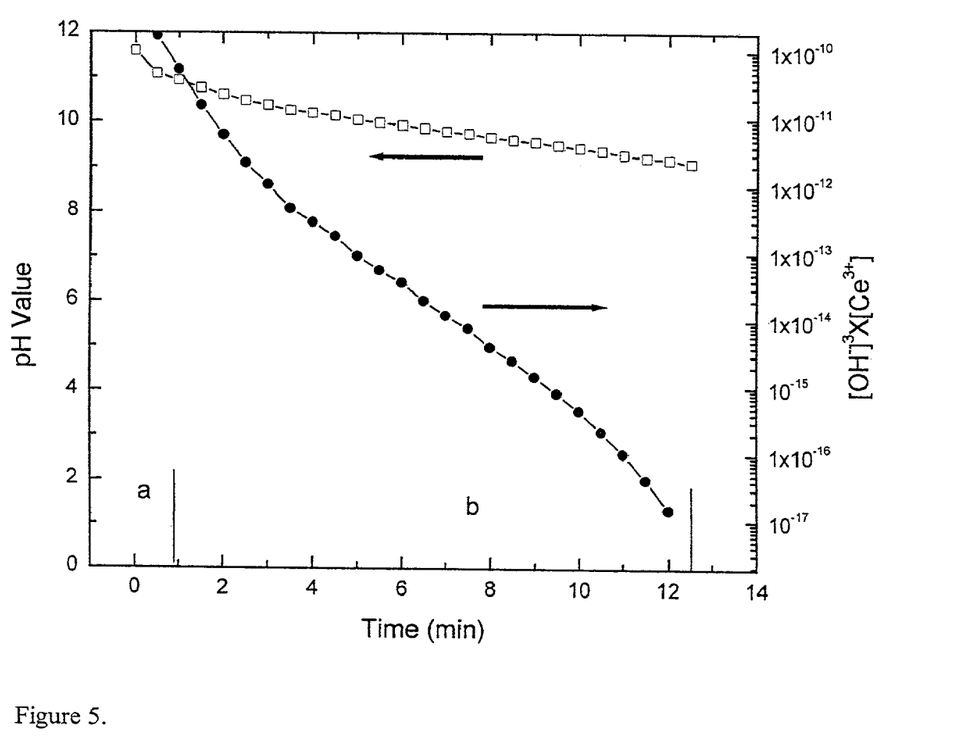
FIG. 5 is a graph of the pH evolution and the cerium ion dissipation in the SIP process without using oxygen.

FIG. 5 is a graph showing pH value on the first ordinate axis, time in minutes on the abscissa axis, and cerium hydroxide concentration on the second ordinate axis for the SIP feeding process. During the SIP feeding process, the pH value always remains higher than 9 (i.e. [$OH^-$] higher than $10^{-5}$ mol/l). This is shown in FIG. 5 which shows the pH and $[Ce^{+3}][OH^-]^3$ concentration changes as the reaction progresses during the SIP feeding process, without any oxygen bubbling and with the mixer set at 500 rpm. As also shown in FIG. 5, the slurry color changes immediately to brown upon the addition of the cerium salt (section 'a') and then turns light yellow (section 'b') over a period of only 1 minute.

Figure 6:
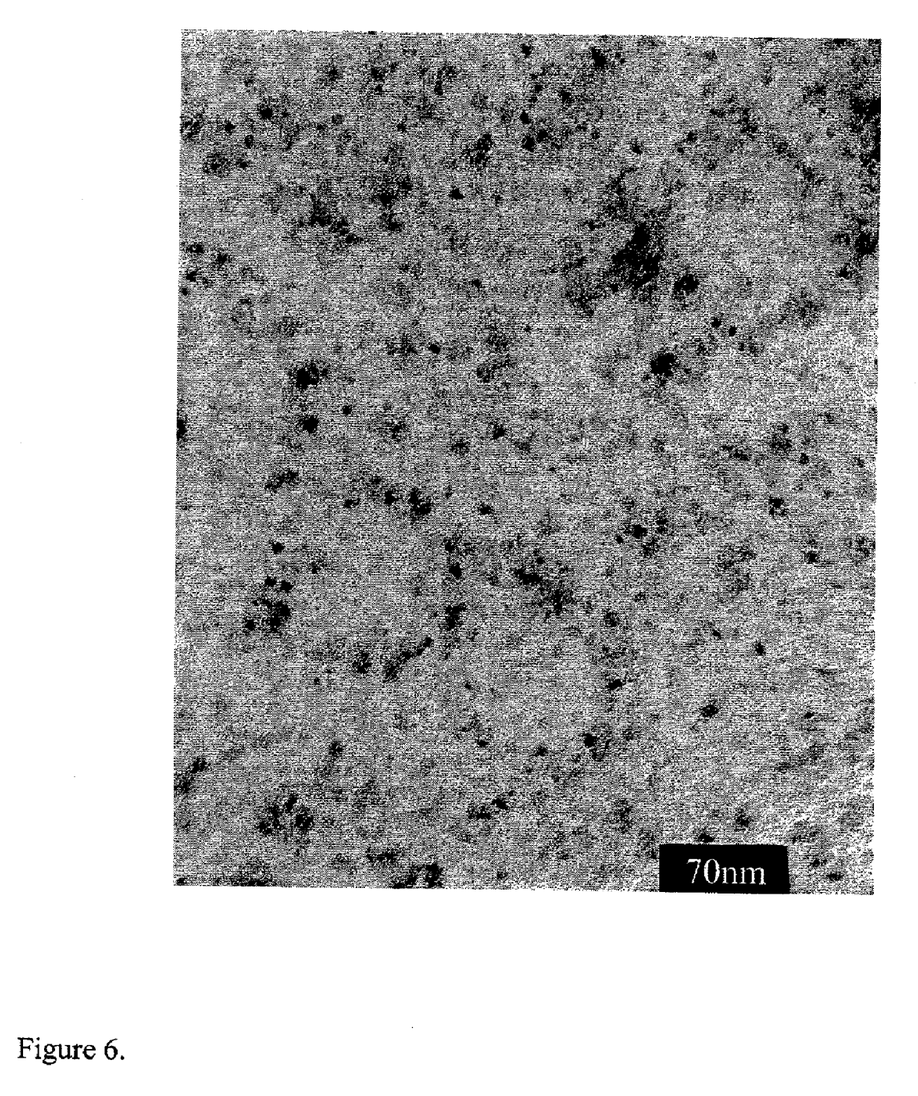
FIG. 6 is a TEM image of the powders prepared from the SIP process without using oxygen.

Under the basic conditions during SIP feeding, the solubility product of $[Ce^{+3}][OH^-]^3$ is much higher than the solubility constant ($K_{sp}$), meaning that the supersaturation value, $$S = \frac{[Ce^{3+}][OH^-]^3}{K_{sp}},$$

is very large. This establishes an environment that favors homogenous nucleation. FIG. 6 is a TEM image of particles made using the SIP feeding process, without any oxygen bubbling and with the mixer set at 500 rpm. The result is primary particles that are ≈10 nm and which are of a uniform size and shape.

Returning to the system shown in FIG. 1, it is advantageous to bubble oxygen gas through reactor 8 while carrying out the reaction. This is accomplished by adding oxygen gas through a stainless steel tube 6 and out a gas distributor 7 at a predefined rate. It is preferred that the oxygen is bubbled through the reactor within the range of 1–500 ml/min. In general, after filtration, a powder cake appears brown due to the presence of $Ce(OH)_3$ (purple) and $CeO_2$ (light yellow). After aging under ambient conditions, it transforms to a totally light yellow powder ($CeO_2$). Drying under a vacuum can accelerate this and results in large amounts of water condensing on the container walls. This appears to be caused by the reaction $2Ce(OH)_3 + \frac{1}{2}O_2 \rightarrow 2CeO_2 + 3H_2O$. Therefore, bubbling $O_2$ during the mixing of the reactants can be applied to speed up this conversion of $Ce(OH)_3$ to $CeO_2$.

This is illustrated by experimental work in which ammonium hydroxide was bubbled with oxygen for 1 minute and then the SIP process was engaged. Adding droplets of the $Ce(NO_3)_3 \cdot 6H_2O$ immediately turned the slurry purple and then over a period of approximately 30 seconds it transitioned through a dark brown to a light yellow color.

Figure 7:
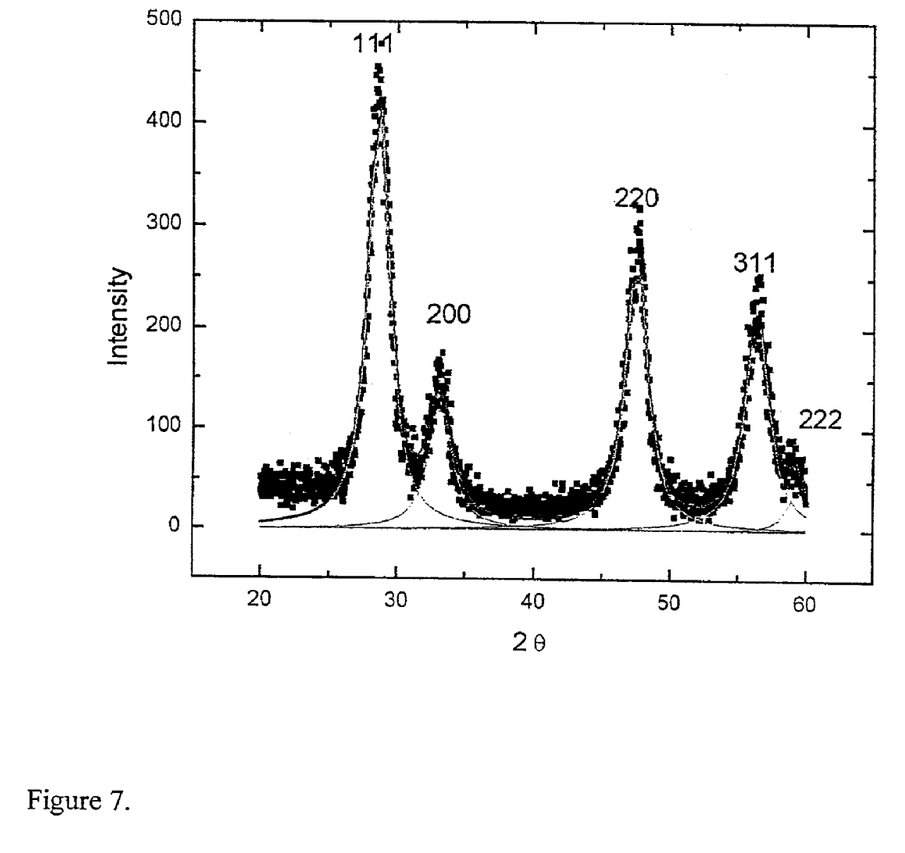
FIG. 7 is an X-ray diffraction pattern of the particles from the SIP process without using oxygen.
Figure 8:
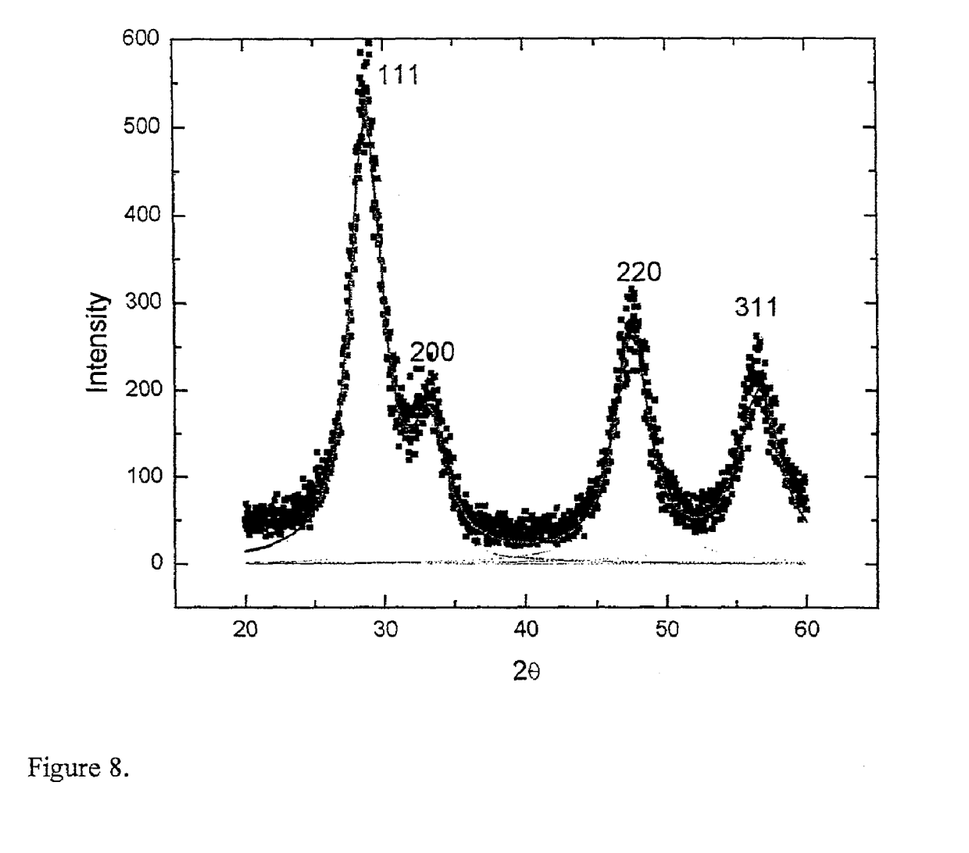
FIG. 8 is an X-ray diffraction pattern of the particles from the SIP process with the use of oxygen.

FIG. 7 is a graph of the XRD pattern from the SIP feeding process with the intensity on the ordinate axis and 2θ on the abscissa axis. The process was carried out at room temperature and with stirring at 500 rpm's without any use of oxygen. It shows a resulting particle size of 5 nm. FIG. 8 is another graph showing the XRD pattern with the intensity on the ordinate axis and 2θ on the abscissa axis. The process used in FIG. 8 is the identical process used in FIG. 7 except that oxygen was bubbled through the solution during the reaction. The particle size in this case is 3 nm and the particles are less agglomerated as shown in FIG. 6, which is a TEM image of the resulting particles. However, the powder shown in FIG. 7, while being more agglomerated than the powder shown in FIG. 8, is only lightly agglomerated, and can be easily re-dispersed in a solution.

It appears that bubbling the oxygen gas simply maintains the equilibrium concentration of oxygen gas that is dissolved in the solution. This is because the overall results indicate that the nucleation step is the fastest, meaning that $Ce(OH)_3$ formation is immediate and would not be impacted by the presence of an $O_2$ bubble. The oxidation reaction can either take place at the surface of the $O_2$ bubble or with dissolved $O_2$. The equilibrium concentration of oxygen in water-ammonium hydroxide solutions ranges from 10 to 25 ppm. In a 500 ml reactor and a typical batch size of approximately 10 grams of $Ce(OH)_3$, this would not be sufficient fully oxidize all of the $Ce(OH)_3$ to $CeO_2$. The bubbling $O_2$ would replenish the dissolved $O_2$ in the solution and allow this reaction to continue to completion faster. In any case, the use of $O_2$ bubbling during the SIP process yields the finest and least agglomerated $CeO_2$ powder.

In the system shown in FIG. 1, reactor 8 is maintained at a constant temperature, preferably room temperature, through a temperature controller 9. Varying the temperature that the reaction is carried out at affects the particle size that is synthesized. In experimental work carried out at 70° C. the particles of $CeO_2$ were 50 nm. The same process carried out at 20° C. resulted in particles that were only 15 nm. As can be seen, the smallest particle sizes occur around room temperature, so no heating is needed in order to generate the smallest particle sizes. However, the temperature of the reactor can be increased in order to synthesize particles of $CeO_2$ powder of a desired larger size.

Figure 9:
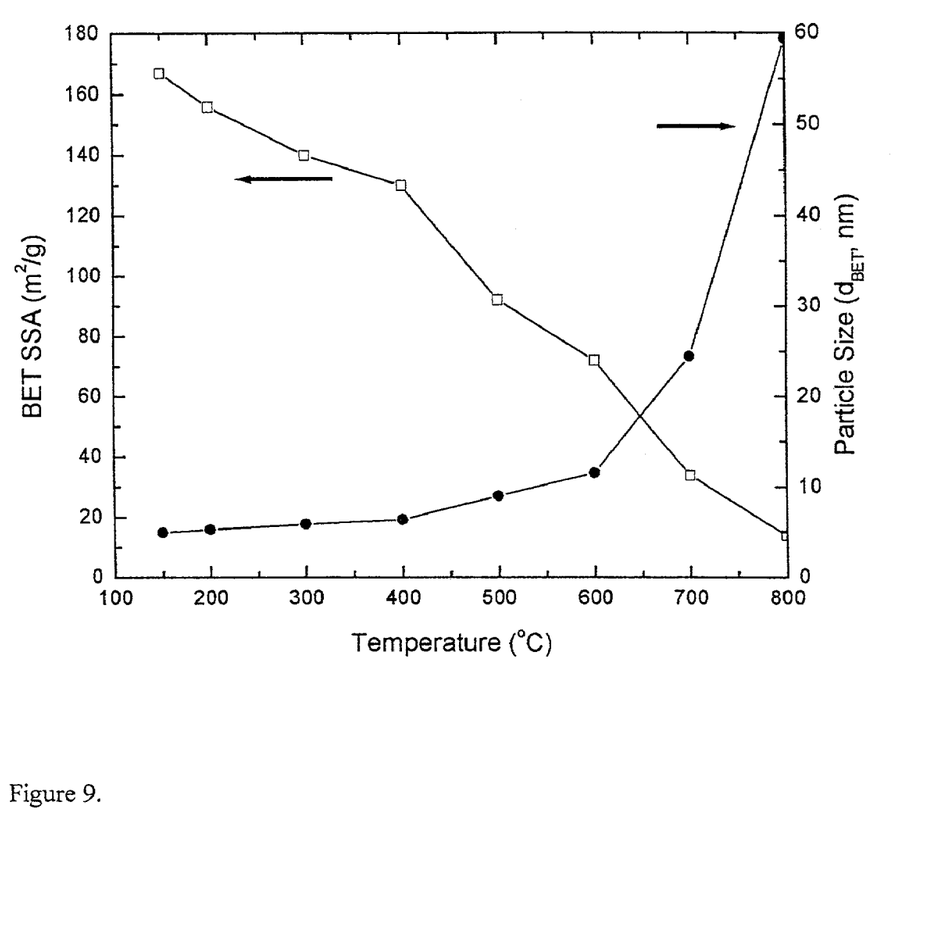
FIG. 9 is a graph of the variation of $CeO_2$ specific surface area and particle size vs. annealing temperature.
Figure 10:
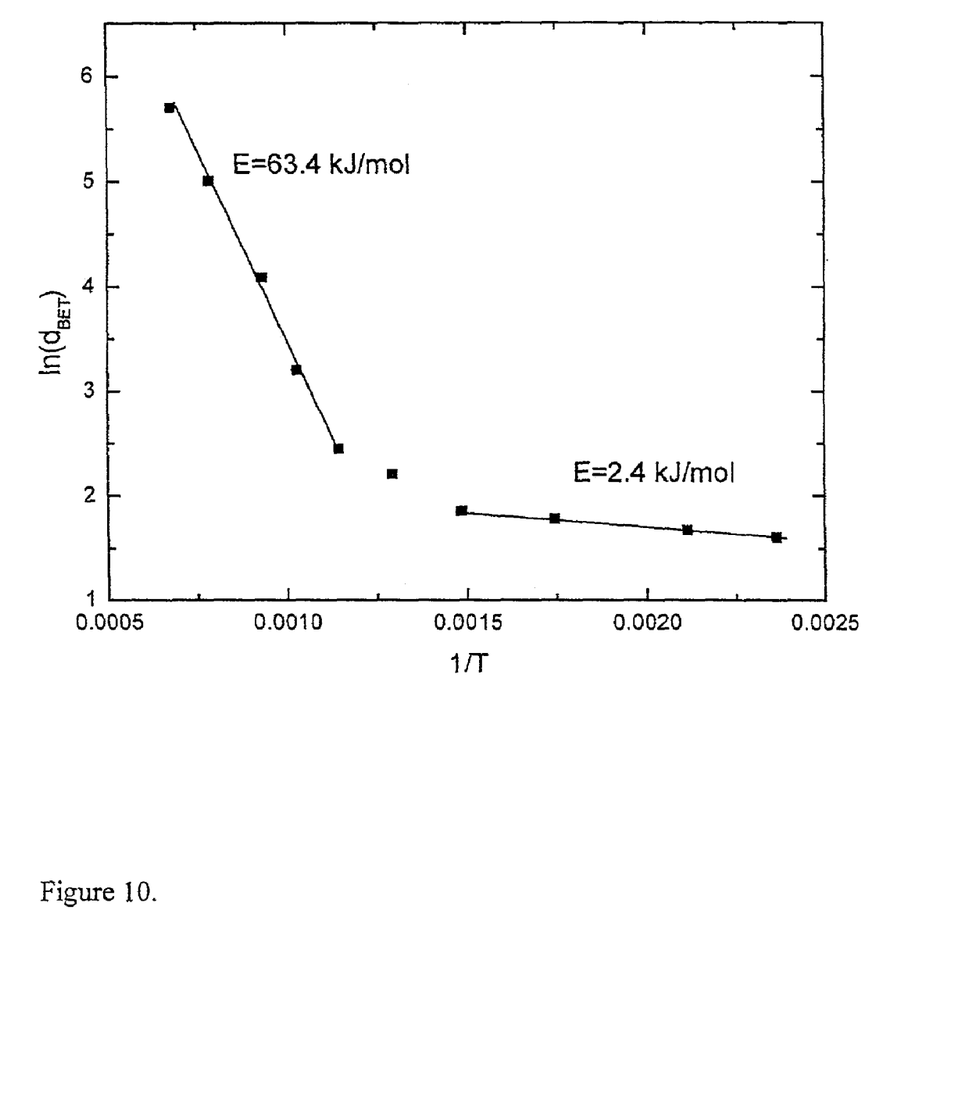
FIG. 10 is a graph of the variation of $CeO_2$ particle size in nanometers vs. temperature.

In addition, the particles synthesized with this process will coarsen when heated. FIG. 9 is a graph showing the BET specific surface area ($m^2/g$) on the first ordinate axis, temperature (C°) on the abscissa axis and particle size (nm) on the second ordinate axis. It shows the SSA and the corresponding particle size for annealing temperatures ranging from 150° to 800° C., all for a 1-hour soak time. FIG. 9 shows that the particle size increases slowly from 4 nm up to 10 nm at 500° C. and then begins to rapidly increase to reach 100 nm at 800° C. This information can be plotted in an Arrhenius manner as is shown in FIG. 10, which is a graph showing the natural log of the particle size (nm) on the ordinate axis and the inverse of the annealing temperature (C°) on the abscissa axis, to show two distinct linear regions. The activation energy in the low temperature range is 2.4 kJ/mol and in the high temperature range the activation energy is 63.4 kJ/mol. Therefore, it appears that there are two different mechanisms for crystal growth at the different temperatures, which can be used to generate ceria particles of the desired size.

Figure 11:
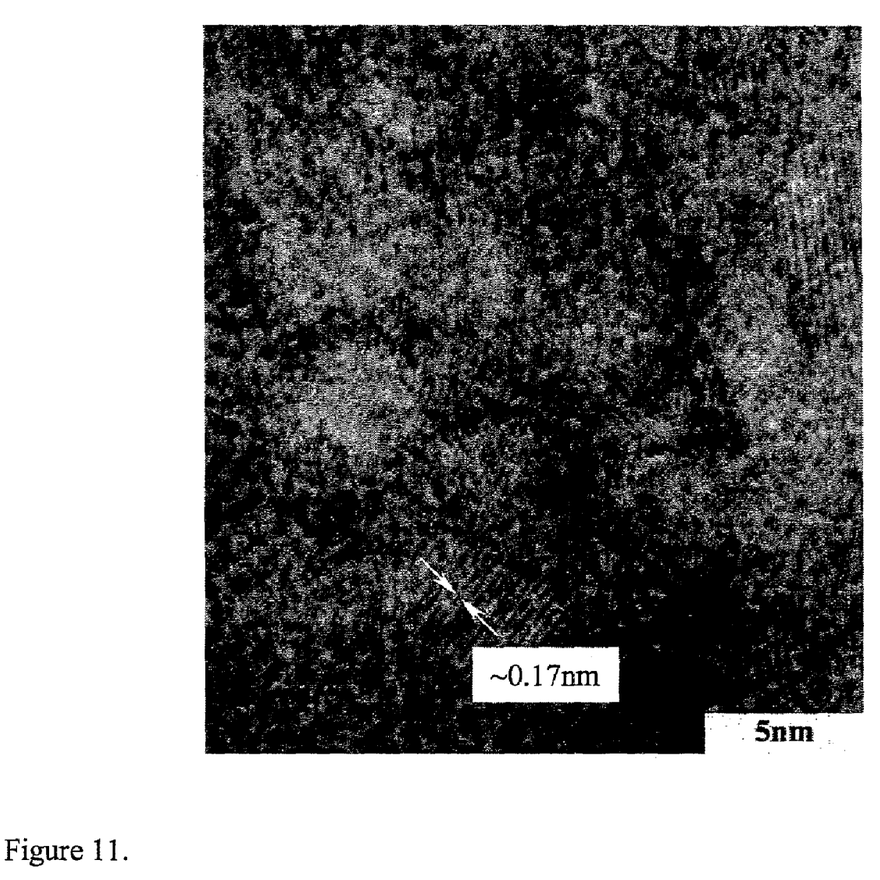
FIG. 11 is a TEM image of the disordering structure of nanometer $CeO_2$ particles.

FIG. 11 is a TEM lattice image of a collection of $CeO_2$ primary particles after room temperature drying. It can be seen that there are many crystal regions (supporting the XRD data) but there is also a large fraction of the ensemble in disorder, perhaps even amorphous. This state likely provides a large driving force for diffusion and subsequent growth at higher temperatures. Lattice diffusion typically has a lower activation energy then other mechanisms so it is possible that simple atomic rearrangement and ordering results in the slow crystal increase at lower temperatures. At higher temperatures, boundary diffusion possibly controls the particle size evolution because of the higher energy associated with long range ordering and particle rearrangement. Therefore, this data can be used to pick an annealing temperature that will result in crystal growth to the desired size.

Figure 12:
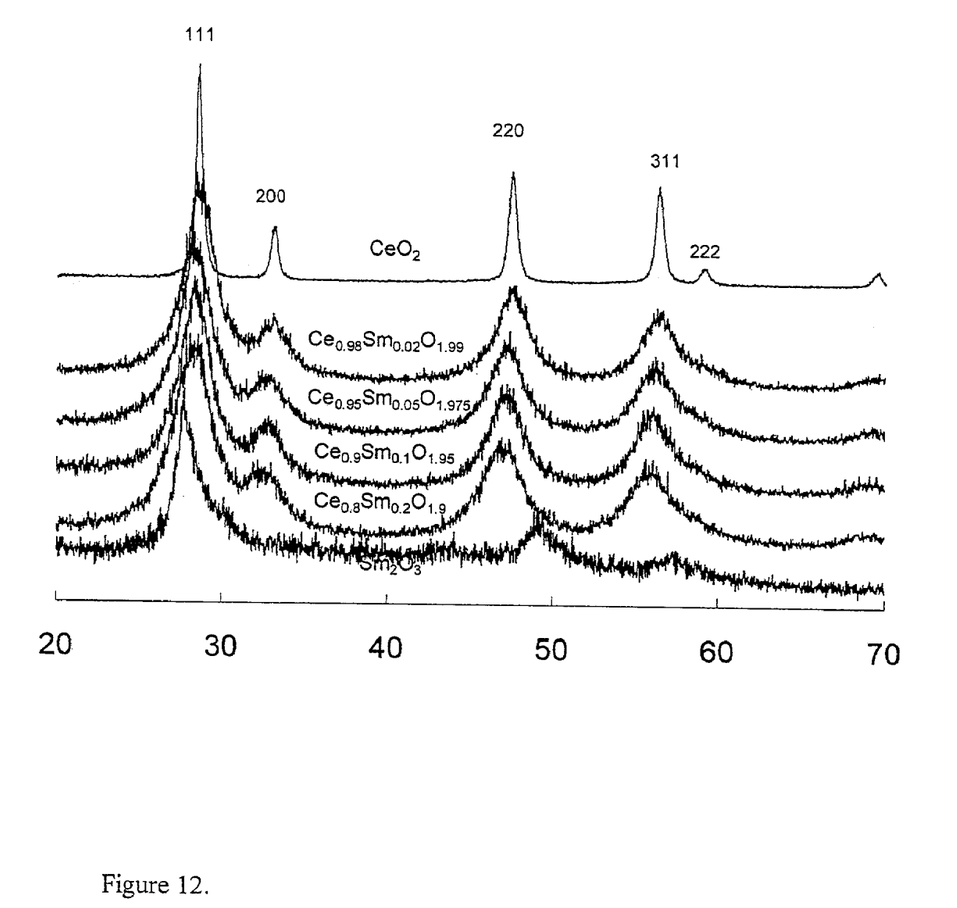
FIG. 12 is an X-ray diffraction pattern of Sm doped $CeO_2$, $SmO_2O_3$ and $CeO_2$

As disclosed above, many of the applications for $CeO_2$ utilize the high ionic conductivity that can be achieved by acceptor doping with lanthanide elements such as $La^{3+}$, $Sm^{3+}$, and $Gd^{3+}$. Of these, $Sm^{3+}$ yields the highest ionic conductivity. During the SIP process the supersaturation values for $Ce^{3+}$ ranges from $1.4 \cdot 10^{13} \sim 1.4 \cdot 10^{10}$ depending on how much the $Ce^{3+}$ diffuses through the reactor when it is added to the ammonium hydroxide. Using the $K_{sp}$ values from Table I, the supersaturation value for $Sm^{3+}$ is $5.4 \cdot 10^{11}$. The theoretical and calculated values differ somewhat in Table I most likely due to the assumption of equilibrium for the calculated values. As a result of the supersaturation values, during SIP feeding, it appears that $Ce^{3+}$ and $Sm^{3+}$ precipitate simultaneously. In addition, FIG. 12 is a graph showing of a number of ERD patterns with the intensity on the ordinate axis and $2\theta$ on the abscissa axis. FIG. 12 shows the XRD patterns of the as-synthesized (i.e. not thermally annealed) $Ce_{1-x}Sm_xO_2$ (x=0.02, 0.05, 0.10, and 0.20) and $Sm_2O_3$, along with $CeO_2$ annealed at 800° C. for reference. Clear shifts in the diffraction peaks are evident as greater amounts of [$Sm^{3+}$] were added. This establishes that a solid solution has formed. Similar results were achieved for $La^{3+}$ and $Gd^{3+}$ doped $CeO_2$.

TABLE I

| Element | Experimental $K_{sp}$ | Calculated $K_{sp}$ |
|---|---|---|
| La | 1.10E−19 | 5.01E−21 |
| Ce | 7.00E−21 | 1.26E−20 |
| Sm | 4.60E−23 | 3.16E−17 |
| Gd | 1.80E−23 | 2.51E−16 |

On the other hand, the supersaturation values for PIS feeding (pH=7.3) are 1.1 for $Ce^{3+}$ and 43.2 for $Sm^{3+}$, for [$Ce^{3+}$]=1.0 mol/l and [$Sm^{3+}$]=0.25 mol/l. These conditions resulted in the successive precipitation of $Ce^{3+}$ and $Sm^{3+}$ hydroxides and consequently cation segregation in the dried powder. However due to the fine particle size, it is believed that at relatively low temperatures a solid solution would form.

The particle size and morphology were determined by transmission electron microscopy (TEM, Philips EM420). Samples for the TEM were prepared by ultrasonically dispersing the powders in ethanol, and then droplets were placed on carbon-coated Cu grids. Corresponding electron diffraction patterns (EDF) were used to characterize the particle crystallinity, as well as X-ray diffractometry (XRD; Scintag 2000). The specific surface area (SSA) is inversely related to the particle size and is calculated by the Brunauer-Emmett-Teller (BET) method. (Quantachrome; Nova 1000).

$$\text{The particle size} = \frac{6}{\rho \cdot SSA}$$

where $\rho$ is the density of the powders (g/cm$^3$).

The theoretical density of $CeO_2$ was calculated using the lattice parameters calculated from the XRD pattern. X-ray line broadening ($20° \leq 2\theta \leq 100°$) was used to calculate the x-ray coherence length, which corresponds to the particle size after correcting for strain effects using the Lorentz intensity breadth. The theoretical densities $\rho_{th}$, (kg/m$^3$) of the lanthanide doped $CeO_2$ compositions were calculated by $$\rho_{th} = \frac{4}{n_A a^3}[M_{Ce}(1-x) + M_{Ln}x + M_O(2 - 0.5x)],$$

where $M_{Ce}$, $M_{Ln}$ and $M_O$ are the molecular weights of the sub-species in kg/mole, $n_A$ is Avogadro's number ($6.023 \cdot 10^{23}$/mole), and 'a' (meters) is the XRD lattice parameter. All lanthanide elements were assumed to be in the 3+valance state.

The crystal grain size was determined by powder x-ray diffraction, analyzing the pattern by simulation based upon the Gaussian and Lorentz distribution after correcting for the strain effect. The equation, which was used, is shown as:

$$\beta_{total} = \beta_{XRCL} + \beta_{Strain} = \frac{0.9\lambda}{t\cos\theta} + \frac{4(\Delta d)}{d}\tan\theta.$$

A plot of $\beta_{total}(\cos \theta)$ vs. $\sin \theta$ has the intersection of $0.9 \lambda/t$, where $\lambda$ is the wavelength of generated x-ray and t is the sample x-ray coherence length, i.e. the crystal grain size. This was compared to the particle size calculated above to ensure that each particle was a single grain crystal.

In order to further illustrate the present invention and the advantages thereof, the following specific examples are given, it being understood that same are intended only as illustrative and in no way limiting:

EXAMPLE 1

Ammonium hydroxide aqueous solution with a concentration of $1.5 \cdot 10^{-3}$ mol/g was placed in a semi-batch tank reactor. A $0.5 \cdot 10^{-3}$ mol/g solution of cerium nitrate aqueous solution was the fed into the reactor (SIP feeding). There was a 20% excess of the ammonium hydroxide solution. The feeding rate was controlled by a peristaltic pump supplied by Fisher. The ammonium hydroxide solution was constantly stirred at a rate of 300 rpm with the power load of the stirrer being automatically adjusted with the changing viscosity of the slurry in the reactor. The reactor temperature was set at room temperature. Oxygen was bubbled into the reactor at a rate of 20 l/min as controlled by a gas flow-meter. The slurry was vacuum filtered and then vacuum dried at room temperature. The SSA data were found to be about 150 m$^2$/g and the TEM microscopy photos showed that the particle size is around 3–5 nm. This was confirmed to be the same size as a single crystal from the x-ray diffraction pattern.

EXAMPLE 2

The same setup as in example 1 is used. This time PIS feeding was used with ammonium hydroxide aqueous solution used as the feeding precursor and cerium nitrate solution in the reactor. The feeding rate was controlled between 0.5 ml/min to 8 ml/min. At a reactor temperature of 70° C. the average synthesized particle size was 50 nm and at a reactor temperature was of 20° C. the average particle size was 15 nm.

EXAMPLE 3

PIS feeding was carried out as in example 1 at room temperature, a feeding rate of 5 ml/min and a stirrer rate of 1000 rpm. When oxygen was bubbled through the reactant mixture the smallest particle size obtained was 4 nm. Without the use of oxygen the smallest particle size obtained was 12 nm.

EXAMPLE 4

The method used in Example 1 was repeated using double feeding, which is where ammonium hydroxide aqueous solution and cerium nitrate solution are both used as feeding solutions into a reactor that contains distilled water. The feeding rate was kept in the range of 1 ml/min to 8 ml/min. The temperature was 25° C. and the mixture was stirred to establish turbulent conditions. The average particle size is 10 nm. Oxygen was not used in this example.

EXAMPLE 5

Solid solutions were observed using the above method with the Lanthanide element in a nitrate or acetate compound that was dissolved in water to form an aqueous solution, which was used as the dopant precursor.

a. Niobium-citric acid aqueous solution was used as the precursor in the double feeding method to form niobium and cerium mixed compounds. These compounds were transferred to solid solution after being sintered.

b. Yttrium nitrate or acetate aqueous solution was used as the lanthanum dopant precursor and mixed with the cerium nitrate solution. This mixed solution was used as the feeding solution in SIP feeding. A solid solution resulted from the reaction.

c. Zirconia hydroxy acetate aqueous solution or the acetate aqueous solution was used as the dopant precursor and mixed with the cerium nitrate aqueous solution. This mixed solution was used as the feeding solution in SIP feeding. A solid solution resulted from the reaction.

d. Double feeding of the doped element precursors from a, b, and c were used as a separate feeding solution in double feeding method. The solution in the reactor was distilled water. The reaction resulted in the formation of a solid solution in each of the cases.

Having described specific embodiments of the invention, it is understood that modifications thereof may be suggested by those skilled in the art, and it is intended to cover all such modifications as filed within the scope of the appended claims.

What is claimed is:

1. A process for the production of cerium dioxide crystals comprising:
    (a) providing a first solution of a water-soluble cerium salt solution;
    (b) providing a second aqueous solution of an alkali metal or ammonium hydroxide;
    (c) mixing said first and second solutions together to form a reactant solution;
    (d) agitating said reactant solution under turbulent flow conditions while concomitantly passing gaseous oxygen through said reactant solution; and
    (e) precipitating cerium dioxide particles having a predominant particle size within the range of 3–100 nanometers.

2. The method of claim 1 wherein said cerium salt is cerous nitrate.

3. The method of claim 1 wherein said second solution is an aqueous solution of ammonium hydroxide.

4. The method of claim 3 wherein the ammonium hydroxide solution ranges from 0.1 mol/l to 1.5 mol/l.

5. The process of claim 1 wherein the agitation of said reactant solution is carried out within a reactor vessel to which one of said first and second solutions is added followed by the addition of the other said first and second solutions.

6. The method of claim 5 wherein the other first and second solution is added to the reactor vessel at a rate of from 0.5 ml/min to 10 ml/mm.

7. The method of claim 5 wherein the first solution is added to the reactor vessel followed by the addition of the second solution to the reactor vessel.

8. The method of claim 5 wherein the second solution is added to the reactor vessel followed by the addition of the first solution to the reactor vessel.

9. The method of claim 8 wherein said cerium salt is cerous nitrate, said second aciueous solution is an aqueous solution of ammonium hydroxide, the first solution is added to the reactor vessel at a rate within the range of 0.5 ml/min to 10 ml/min, said agitating of said reaction solution is accomplished by stirring the solution with an impeller at a rate within the range of 100–5000 rpm during the mixing of said first and second solution, and wherein the oxygen is passed through said reactant solution at a rate from 1 ml/min to 500 ml/min.

10. The method of claim 1 wherein distilled water is added to a reactor followed by the simultaneous addition of the first and second solutions to the reactor.

11. The method of claim 1 wherein the agitating of said reactant solution is accomplished by stirring the reactant solution with an impeller at a rate within the range of 100–5000 rpm during the mixing step.

12. The method of claim 1 wherein the oxygen is passed through said reactant solution at a rate within the range of 1 ml/min to 500 ml/min.

13. The method of claim 1 that further comprises mixing a dopant precursor solution comprised of the nitrate or acetate form of a lanthanide series metal with the first and second solutions.

14. The method of claim 13 wherein the dopant precursor solution is mixed with the first solution prior to mixing with the second solution.

15. The method of claim 13 wherein the reactant solution is maintained at room temperature.

16. The method of claim 1 further comprising the step of vacuum drying said cerium dioxide particles.

17. The method of claim 1 further comprising the step of heating the precipitate to result in the growth of the particles to a desired size.

18. The method of claim 1 wherein each of the cerium dioxide particles is a single crystal.

* * * * *